(12) United States Patent
Balzer

(10) Patent No.: US 6,786,037 B2
(45) Date of Patent: Sep. 7, 2004

(54) SEGMENTED MIXING DEVICE HAVING CHEVRONS FOR EXHAUST NOISE REDUCTION IN JET ENGINES

(75) Inventor: Ronald L. Balzer, Bothell, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/351,649

(22) Filed: Jan. 23, 2003

(65) Prior Publication Data

US 2003/0115852 A1 Jun. 26, 2003

Related U.S. Application Data

(63) Continuation-in-part of application No. 09/822,962, filed on Mar. 30, 2001, now Pat. No. 6,612,106.
(60) Provisional application No. 60/203,222, filed on May 5, 2000.

(51) Int. Cl.$^7$ .................................................. F02F 1/38
(52) U.S. Cl. ............................ 60/204; 60/262; 60/770; 279/265.17; 181/206
(58) Field of Search ........................ 60/204, 262, 264, 60/770, 200.1, 237, 266, 269, 721, 761, 767; 239/265.17, 265.19, 265.4, 265.15, 265.25, 265.43; 181/206, 220, 175, 196, 296, 400

(56) References Cited

U.S. PATENT DOCUMENTS

| | | | | |
|---|---|---|---|---|
| 4,311,291 A | * | 1/1982 | Gilbertson et al. | 244/211 |
| 4,576,002 A | * | 3/1986 | Mavrocostas | 60/262 |
| 5,222,359 A | * | 6/1993 | Klees et al. | 60/204 |
| 5,771,681 A | * | 6/1998 | Rudolph | 60/262 |
| 5,924,632 A | * | 7/1999 | Seiner et al. | 239/265.19 |
| 6,082,635 A | * | 7/2000 | Seiner et al. | 239/265.19 |
| 6,360,528 B1 | * | 3/2002 | Brausch et al. | 60/262 |

\* cited by examiner

*Primary Examiner*—Justine R. Yu
*Assistant Examiner*—John F. Belena
(74) *Attorney, Agent, or Firm*—Conrad O. Gardner

(57) ABSTRACT

Disclosed is a segmented mixing device for reducing jet engine exhaust noise wherein mixing is enhanced between adjacent exhaust flows and between exhaust flow and freestream flow. The device does so with a very small degradation in aircraft performance. The device is a segmented, triangular or trapezoidal shaped, curved extension to a nozzle's sleeve that results in a serrated trailing edge. The nozzle extensions enhance the natural free mixing of the jet's exhaust flows and therefore reduce the acoustic energy associated with the velocity differences between the streams in which they are imbedded. The novel structure forces adjacent flows to penetrate into one another to a greater depth than that achievable with free mixing and results in a more uniform flow in a shorter stream wise distance while limiting high frequency noise through utilization of root radii in the order of 15 to 20% of the segment's width at the intersection of a parent nozzle.

14 Claims, 3 Drawing Sheets

SEGMENTED MIXING DEVICE HAVING CHEVRONS FOR EXHAUST NOISE REDUCTION IN JET ENGINES

CROSS-REFERENCE TO RELATED APPLICATIONS

This continuation-in-part application claims priority from application Ser. No. 09/822,962, filed Mar. 30, 2001, is now U.S. Pat. No. 6,612,106, which claims priority from provisional application Ser. No. 60/203,222, filed May 5, 2000.

FIELD OF THE INVENTION

Jet engines can produce a high noise level if the velocity of the mass flow exiting the engine is non-uniform and high. For performance considerations, jet engines often have multiple nozzles with the mass flow exiting each nozzle at a different velocity. Since noise radiating from a jet's exhaust increases with the intensity and non-uniformity of the exhaust velocity, jet noise reduction concepts have historically focused on methods for rapidly mixing the flows and achieving a uniform velocity within a short distance of the nozzles.

BACKGROUND OF THE INVENTION

Various flow-mixing devices have been employed in the past to achieve a uniform velocity within a jet's exhaust and to reduce the noise radiated from the exhaust flow. While those devices have been successful at reducing jet noise, the thrust, drag, and weight penalty associated with those devices have often been of a magnitude that the noise at constant aircraft performance has not been reduced. During the NASA Advanced Subsonic Transport (AST) Program (reference 1) sharp pointed, triangular shaped, extensions added to the sleeve of an external plug primary nozzle were tested and were found to reduce jet noise. A. D. Young et al (U.S. Pat. No. 3,153,319, reference 2) also developed extensions that when added to the trailing edge of nozzles reduced jet noise. Brausch et al. (U.S. Pat. 6,360,528 B1 shows nozzle extensions having a planform with semi-round intersections with the baseline nozzle and semi-round trailing edges.

The primary difference between the above-described prior art and the hereinafter described, invention is the rounding of the upstream intersection of the extensions with the nozzle and the rounding of the extension's trailing edge with differing root radii and tip radii. Rounding has as hereinafter described been found to enhance the reduction of low and mid-frequency noise (frequencies below 2000 Hz) by inhibiting an increase in high (frequencies above 2000 Hz) frequency noise and to reduce the thrust loss of sharp-pointed segmented nozzles. Increased high frequency noise has been a characteristic of the previous sharp edged devices even though they have reduced low and mid-frequency noise and have had a net acoustic benefit.

BRIEF DESCRIPTION OF THE SEVERAL VIEWS OF THE DRAWING

FIG. 7 is a segmented nozzle extension mixing device applied to trailing edge of gas flow nozzle.

DETAILED DESCRIPTION OF THE INVENTION

Figure 1:
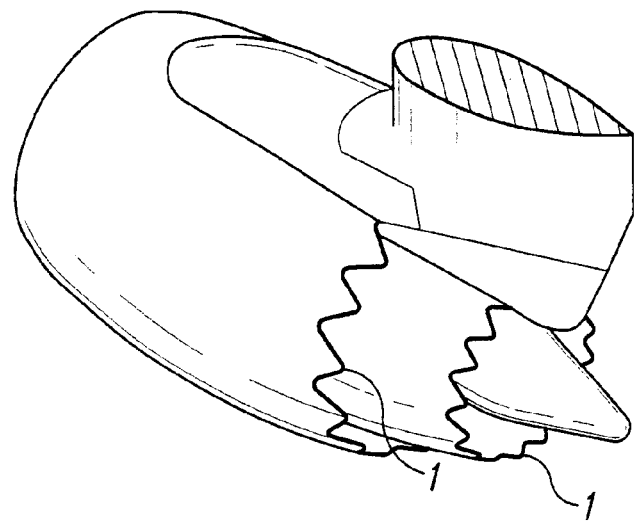
FIG. 1 is a perspective view of a jet engine segmented mixing device with external plug nacelle.
Figure 2:
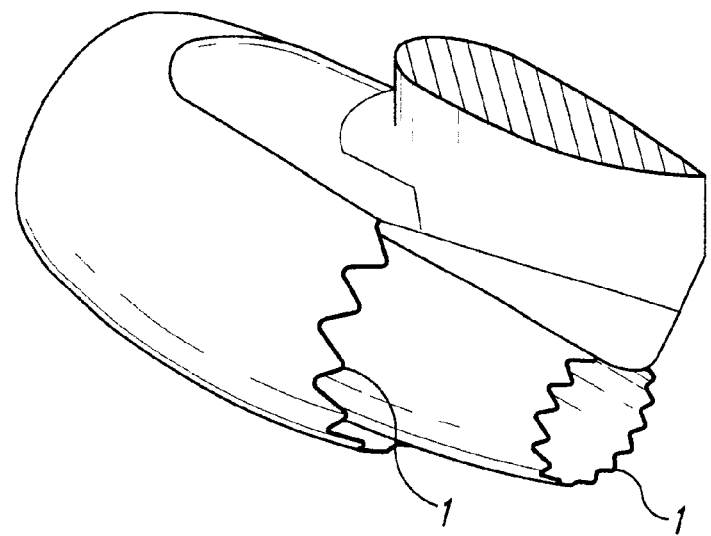
FIG. 2 is illustrative of a segmented mixing device with internal plug nacelle.
Figure 3:
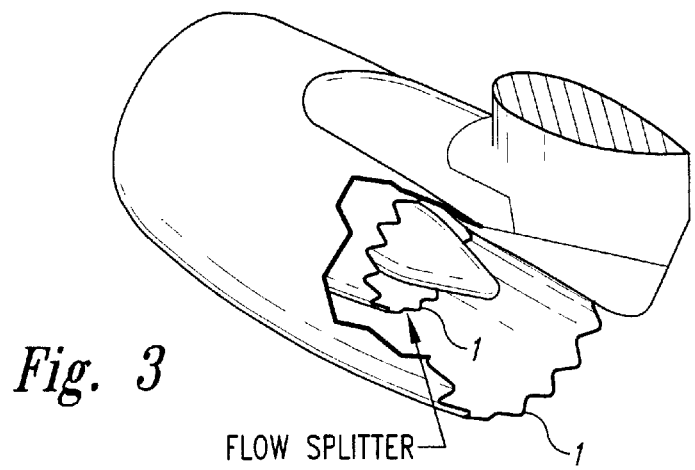
FIG. 3 is a jet engine device with mixed flow nacelle.
Figure 4:
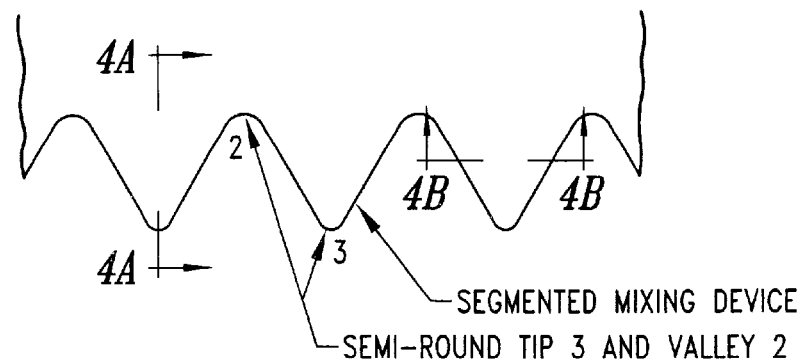
FIG. 4 is a semi-round tip triangular planform showing of a segmented mixing device nozzle sleeve.
Figure 5:
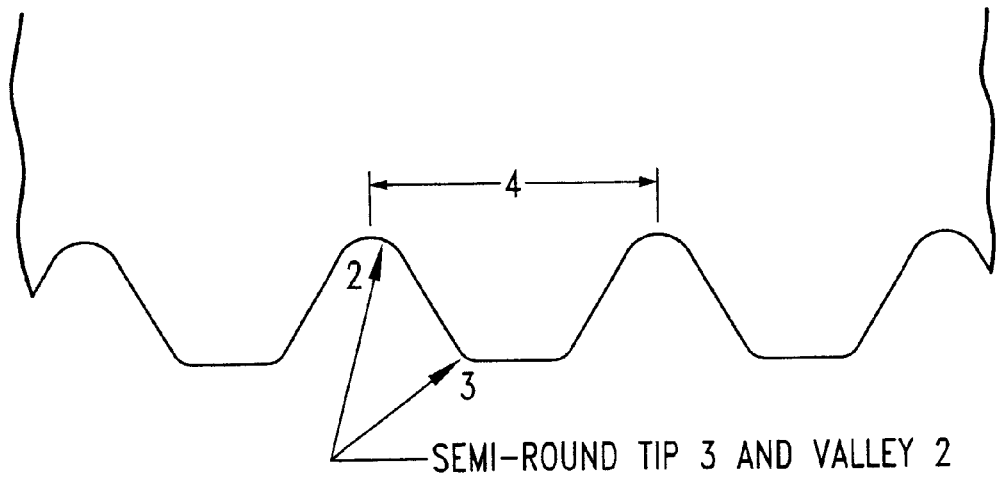
FIG. 5 is further illustrative of the present trapezoidal planform nozzle sleeve; and, FIG. 6 is illustrative of streamwise vortex flow.

The present invention comprises a segmented mixing device which, when applied to the nozzle of a jet engine, enhances mixing between adjacent flows and reduces the noise radiated from the jet's exhaust flow. The device does so with a very small degradation in aircraft performance. The mixing device is a segmented, triangular or trapezoidal shaped, curved extension 1 to a nozzle's sleeve which results in a serrated trailing edge (see FIGS. 1, 2, and 3). This invention comprises: 1) A modification from the sharp pointed, triangular shaped, nozzle extensions evaluated in the hereinafter referenced NASA AST program to a semi-round, triangular or trapezoidal shaped planform (see FIGS. 4 and 5). 2) An application of the present nozzle extensions to internal and external plug primary nozzles of dual flow exhaust systems (see FIGS. 1 and 2). 3) An application of the nozzle extensions to secondary nozzles of dual flow exhaust systems (see FIGS. 1 and 2). 4) An application of the nozzle extensions to the nozzle of mixed flow exhaust systems and the flow splitter between the primary and secondary streams of those systems (see FIG. 3). And, 5) an application of the nozzle extensions to the trailing edge of any surface separating adjacent flows wherein enhanced mixing is desired.

Figure 4A:
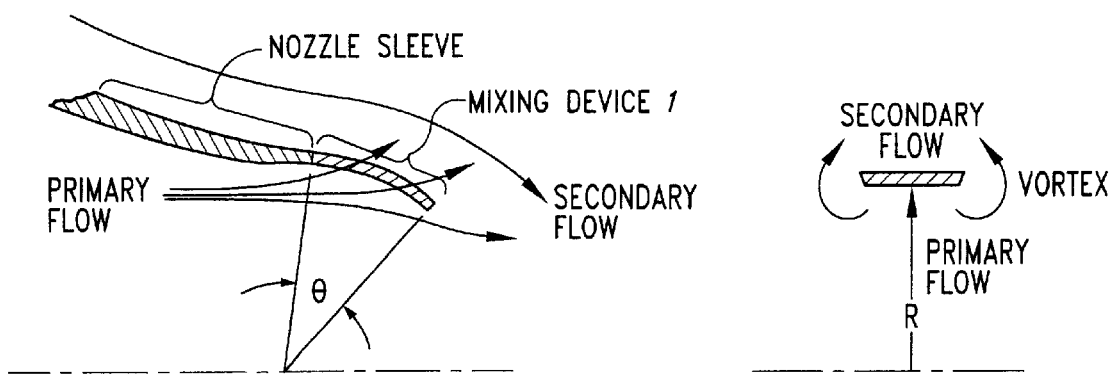
FIG. 4A is a sectional view taken along the lines 4A—4A of FIG. 4 showing in more detail how the outer surface of the mixing device extensions curve inward towards the engine center line.
Figure 4B:
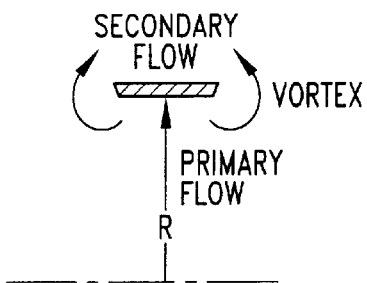
FIG. 4B is a sectional view taken along the lines 4C—4C of FIG. 4A showing in more detail how the extensions having a planform shape create a streamwise vortex.
Figure 6:
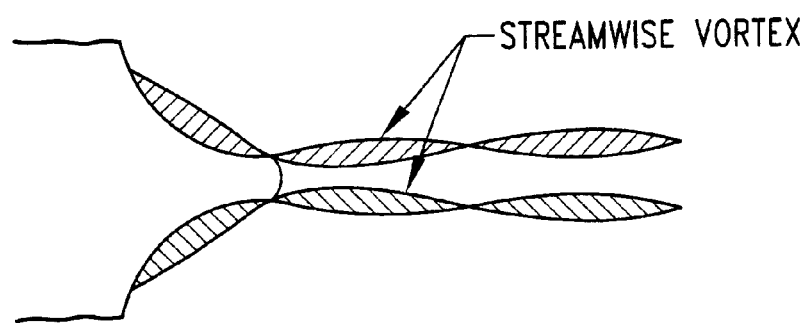

The purpose of the present nozzle extensions 1 is to enhance the natural free mixing of the exhaust flows and to reduce the acoustic energy associated with the velocity differences between the streams in which they are imbedded. The presently configured nozzle extensions enhance the natural free mixing between adjacent streams by forcing the adjacent flows to penetrate into one another to a greater depth than that achievable with free mixing and therefore results in a more uniform flow in a shorter stream wise distance. The acoustic benefit of the extensions improves as the velocity differences between the streams increase. Two methodologies are employed to enhance mixing: 1) The outer surface of the extensions curve inward towards the engine centerline forcing the secondary (outer) flow into the primary (inner) flow (see FIG. 4A). 2) The extensions have a planform shape that creates a stream wise vortex that also enhances rapid mixing of the two streams (see FIG. 4B and FIG. 6). Outward turned segments can also be used to enhance mixing. However, the thrust losses for outward turned segments has been greater than for inward turned segments. The present concept however includes rounding to outward turned segments.

Unlike the previous NASA AST configurations and the A. D. Young et al. configurations described in U.S. Pat. No. 3,153,319, the extensions defined herein incorporate a planform with semi-rounded intersections with the baseline nozzle and semi-round trailing edges. The purpose of the upstream rounding is to increase the strength of the stream wise vortex by allowing the primary (inner) flow to exit the nozzle sooner and in a more radial manner. Rounding the upstream intersection also eliminates the stress concentrations and low fatigue life of the previous NASA AST and A. D. Young et al. concepts. Rounding the extension's trailing edge separates the two stream wise vortexes and increases the circumferential surface area available for the secondary (outer) flow to penetrate the primary (inner) flow. In addition, rounding the trailing edge increases the spanwise average turning angle θ, (see FIG. 4A) of the secondary flow resulting in greater penetration of the secondary flow into the primary flow and increased mixing of the two flows. Depending upon planform and tip radius, the average turning angle can be increased 10 to 30% with tip rounding. Rounding has been found to enhance the reduction of low and mid-frequency noise by inhibiting an increase in high frequency noise. The increase in high frequency noise has been a characteristic of the previous designs. Rounding has also been found to be beneficial for reducing the thrust loss of sharp pointed or small radiused extensions. The nozzle extensions may vary in length, width, curvature, and lobe count. They are only constrained by the geometry of the baseline nozzle.

The effect of tip and valley rounding on the acoustics and performance of segmented nozzles is an important parameter. Rounding of the upstream intersection of the segment with the parent nozzle has been found to be important to the gains made in reducing noise. Studies have shown that a radii 2 in the order of 15 to 20% of the planform width 4 of the segment at the intersection with the parent nozzle needs to be used. Larger or smaller radii are not as beneficial in preventing the rise in high frequency noise. While the root radius 2 of the segments is critical to noise, it is also important for reducing the loss in thrust and the loss in nozzle effective area from adding segments. Improvements in the order of 15% of the losses of sharp extensions are common for rounding. While the root radius 2 of the segments is critical to the results, the tip radius 3 is not as critical. Tip radii 3 in the order of 5 to 10% of the planform width are generally adequate. Large tip radii or tip widths can decrease the noise benefits and increase the loss in thrust.

What is claimed is:

1. A segmented mixing device for jet engines comprising a segmented, substantially triangular or trapezoidal shaped, curved extension of a nozzle sleeve wherein a plan view of said nozzle extension comprises a sinusoidal or "saw toothed" wave shape, said nozzle extension having a semi-round valley radius and a semi-round tip radius, said semi-round root radius larger than said semi-round tip radius.

2. A segmented nozzle extension for a jet engine wherein a plan view of said nozzle extension comprises a sinusoidal or "saw toothed" wave shape, said nozzle extension having a semi-round valley root radius and a semi-round tip radius, said semi-round valley root radius larger than said semi-round tip radius, to prevent a rise in high frequency noise and a loss of thrust.

3. A segmented nozzle extension comprising sinusoidal or "saw toothed" wave shape segments with semi-round intersections with a baseline nozzle and semi-round trailing edges, said semi-round intersections with the baseline nozzle having radii in the order of 15% to 20% of a planform width of the segments at the intersection with the baseline nozzle.

4. A segmented extension for a jet engine, said nozzle extension having an outer surface curving inward, toward an engine centerline, thereby forcing an outer flow into an inner flow, and, said nozzle extension having a planform shape with differing semi-round valley root an tip radii which creates a stream wise vortex thereby enhancing rapid mixing of the outer flow and the inner flow.

5. A segmented nozzle extension for a jet engine, said nozzle extension having an outer surface curving outward, away from an engine centerline, thereby forcing an inner flow into the outer flow, and, said nozzle extension having a planform shape with differing semi-round valley root and tip radii which creates a streamwise vortex thereby enhancing rapid mixing of the outer flow and the inner flow.

6. A nozzle extension according to claims 1, 2, 3, 4 or 5 utilized on an internal or external plug primary nozzle and a secondary nozzle of dual flow exhaust systems.

7. A nozzle extension according to claims 1, 2, 3,4 or 5 utilized on a nozzle of a mixed flow exhaust system and a flow splitter between a primary and secondary stream of those systems.

8. A nozzle surface separating adjacent flows, said surface having an extension according to claims 1, 2, 3, 4, or 5 for providing enhanced mixing of the adjacent flows and preventing a rise in high frequency noise above about 2000 Hz, and a drag reduction on downstream surfaces.

9. A nozzle surface separating adjacent flows, said surface having an extension according to claims 1, 2, 3, 4, or 5 for providing enhanced mixing of the adjacent flows and preventing a rise in high frequency noise above about 2000 Hz, or a drag reduction on downstream surfaces.

10. A method for reducing noise radiated from a jet engine exhaust flow comprising the steps of:
    adding an extension according to claims 1, 2, 3, 4, or 5 to a gas flow nozzle; and,
    configuring said extension to reduce noise at frequencies nominally below 2000 Hz while inhibiting an increase in noise nominally above 2000 Hz.

11. In combination:
    a gas flow nozzle;
    said gas flow nozzle having a trailing edge; a segmented extension for said gas flow nozzle; and, said extension having semi-round tips of predetermined radii and valleys having radii exceeding said predetermined radii for enhancing a reduction of low frequency noise by inhibiting an increase in high frequency noise and a loss of thrust.

12. The combination according to claim 11 wherein said extension has a triangular planform.

13. The combination according to claim 11 wherein said extension has a trapezoidal planform.

14. A method for controlling exhaust flow from a jet engine comprising the steps of: providing a segmented extension mixing device incorporating a planform shape with semi-round intersections with a baseline nozzle and semi-round trailing edges, said intersections have a semi-round root radius and said trailing edges have a semi-round tip radius, said semi-round root radius larger than said semi-round tip radius providing rounding of the upstream intersection between extension and baseline nozzle which permits a primary flow to exit the nozzle sooner and in a more radial manner thereby increasing the strength of a streamwise vortex rounding the trailing edge to increase a spanwise average turning angle of a secondary flow resulting in greater penetration of the secondary flow into the primary flow and increased mixing of the two flows; and providing the planform shape and trailing edge radius of the mixing device with a turning angle increase of 10% to 30% over a sharp pointed triangular configuration.

* * * * *